US010774396B2

(12) United States Patent
Yazawa et al.

(10) Patent No.: US 10,774,396 B2
(45) Date of Patent: Sep. 15, 2020

(54) SEAWATER-RESISTANT STAINLESS CLAD STEEL

(71) Applicant: JFE Steel Corporation, Tokyo (JP)

(72) Inventors: Yoshihiro Yazawa, Chiba (JP); Keiichiro Kishi, Fukuyama (JP); Shunichi Tachibana, Fukuyama (JP); Toshiyuki Hoshino, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 98 days.

(21) Appl. No.: 16/013,302

(22) Filed: Jun. 20, 2018

(65) Prior Publication Data

US 2018/0298477 A1   Oct. 18, 2018

Related U.S. Application Data

(63) Continuation of application No. 14/383,655, filed as application No. PCT/JP2013/001460 on Mar. 7, 2013, now abandoned.

(30) Foreign Application Priority Data

Mar. 8, 2012 (JP) .................................. 2012-051124
Dec. 10, 2012 (JP) .................................. 2012/269163

(51) Int. Cl.
| | |
|---|---|
| C21D 8/02 | (2006.01) |
| C21D 6/00 | (2006.01) |
| C22C 38/00 | (2006.01) |
| C22C 38/44 | (2006.01) |
| B32B 15/01 | (2006.01) |
| C22C 38/02 | (2006.01) |
| C22C 38/04 | (2006.01) |
| C22C 38/16 | (2006.01) |
| C22C 38/42 | (2006.01) |
| C25F 3/06 | (2006.01) |
| C22C 38/54 | (2006.01) |

(52) U.S. Cl.
CPC .......... *C21D 8/0226* (2013.01); *B32B 15/011* (2013.01); *C21D 6/002* (2013.01); *C21D 8/02* (2013.01); *C21D 8/0263* (2013.01); *C22C 38/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/16* (2013.01); *C22C 38/42* (2013.01); *C22C 38/44* (2013.01); *C22C 38/54* (2013.01); *C25F 3/06* (2013.01); *B32B 15/01* (2013.01); *Y10T 428/12993* (2015.01)

(58) Field of Classification Search
CPC .......... C25F 3/06; C22C 38/44; C21D 8/0226
See application file for complete search history.

(56) References Cited

U.S. PATENT DOCUMENTS

| | | | |
|---|---|---|---|
| 4,917,969 | A | 4/1990 | Pircher et al. |
| 6,517,643 | B1 | 2/2003 | Asahi et al. |
| 2006/0152001 | A1 | 7/2006 | Matsuhashi et al. |

FOREIGN PATENT DOCUMENTS

| | | | |
|---|---|---|---|
| EP | 0320773 | A2 | 6/1989 |
| EP | 0596121 | A1 | 5/1994 |
| JP | 5812887 | A | 1/1983 |
| JP | 62244910 | A | 10/1987 |
| JP | 63096281 | A * | 4/1988 |
| JP | 6418502 | A | 1/1989 |
| JP | 02232344 | A | 9/1990 |
| JP | 02254121 | A | 10/1990 |
| JP | 02285025 | A | 11/1990 |
| JP | 0953612 | A | 2/1997 |
| JP | 10204526 | A | 8/1998 |
| JP | 3336820 | B2 | 10/2002 |
| JP | 4179133 | B2 | 11/2008 |

OTHER PUBLICATIONS

"Chapter 4—Design and Application of Anti-corrosion Metallic Coatings", Harbor Steel Structure, Corrosion Protection and Repair Manual, 2009 Edition, (Incorporated Foundation), Coastal Development Institute of Technology, (with 2 sheets of English Translation), p. 132.
Japanese Office Action for Japanese Application No. 2014/503498, with Concise Statement of Relevance of Office Action, dated Jan. 20, 2015—5 pages.
Korean Office Action for Korean Application No. 2014 7023671, with Concise Statement of Relevance of Office Action, dated Jan. 27, 2016—6 pages.
Sathirachinda et al., "Depletion Effects at Phase Boundaries in 2205 Duplex Stainless Steel Characterized with SKPFM and TEM/EDS", Corrosion Science 51 (2009), pp. 1850-1860.
Supplementary European Search Report for European Application No. 13758685.5, dated Feb. 4, 2016—9 pages.
Entire patent prosecution history for U.S. Appl. No. 14/383,655, filed Sep. 8, 2014, entitled "Seawater-Resistant Stainless Clad Steel."

(Continued)

*Primary Examiner* — Nicholas A Smith
(74) *Attorney, Agent, or Firm* — RatnerPrestia

(57) ABSTRACT

Disclosed is a manufacturing method for a seawater-resistant stainless clad steel including a cladding material made of stainless steel having a pitting index represented by Cr[mas %]+3.3Mo[mass %]+16N[mass %], of 35.0 or more and a microstructure in a surface portion thereof including, by area ratio, less than 2.0% of a σ phase. The method including the steps of performing a mechanical treatment from at least one of grindstone polishing and belt polishing and performing at least one of an electrolytic treatment in acid solutions or in neutral salt solutions, and a pickling treatment, to manufacture the stainless clad steel having dynamic friction coefficients in the rolling direction and in a direction at a right angle to the rolling direction, determined in accordance with JIS K 7125, both of 0.05 or less.

9 Claims, No Drawings

(56) References Cited

OTHER PUBLICATIONS

Davison et al., "Corrosion of Stainless Steels", Corrosion Metal Handbook, 1987, pp. 547-565.
European Communication Purusant to Article 94(3) for European Application No. 13758685.5, dated Sep. 7, 2018, 5 pages.

\* cited by examiner

SEAWATER-RESISTANT STAINLESS CLAD STEEL

This application is a Continuation of U.S. patent application Ser. No. 14/383,655, filed Sep. 8, 2014, which is a U.S. National Phase Application of PCT International Application PCT/JP2013/001460, filed Mar. 7, 2013, which claims priority to Japanese Application Nos. 2012-051124, filed Mar. 8, 2012, and 2012-269163, filed Dec. 10, 2012, the entire disclosures of each of these applications being incorporated herein by reference in their entireties for all purposes.

TECHNICAL FIELD

This disclosure relates to seawater-resistant stainless clad steel, in particular, to seawater-resistant stainless clad steel excellent in terms of abrasion resistance and seawater pitting resistance which can be used for various applications typified by marine structures, shipbuilding, and seawater desalination facilities.

BACKGROUND

Nowadays, industrial facilities and structures are demanded to meet the needs for durability, life extension, and a maintenance free property, and stainless steel is receiving a lot of attention as a material meeting these demands. On the other hand, alloy elements typified by Ni, Mo, and Cr which are main raw materials of stainless steel tend to undergo increases and changes in price. Therefore, recently, instead of simple stainless steel, stainless clad steel has received a lot of attention as a steel material with which it is possible to utilize the excellent corrosion resistance of stainless steel and which is economical due to a stable and low price. "Stainless clad steel" means a steel material manufactured by bonding two kinds of metal materials having different properties, in which stainless steel is used as a cladding material and plain steel is used as a base material. Since clad steel is manufactured by metallurgically bonding different kinds of metal, there is no concern that separation may occur, which may occur in coated steel, and it is possible to provide new properties which are not achieved by using a single substance of metal or alloy.

To achieve corrosion resistance suitable for the usage environment, the kind of stainless steel used as a cladding material is selected in accordance with the environment in which the stainless clad steel is used, and corrosion resistance equivalent to that of simple stainless steel (consisting of only stainless steel throughout the thickness) is achieved. By using stainless clad steel in this manner, corrosion resistance equivalent to that of simple stainless steel (consisting of only stainless steel throughout the thickness) can be achieved with a small amount of stainless steel material used, and there is an advantage that both cost efficiency and functionality are achieved.

As described above, stainless clad steel is a very advantageous functional steel material and, recently, there has been an increasing need for such a steel material in various industrial fields.

On the other hand, the passivation film of stainless steel tends to be damaged by chloride ions, and its corrosion takes the form of pitting corrosion or crevice corrosion. Therefore, seawater pitting resistance is an important index in seawater because pitting corrosion becomes a source of local corrosion, while corrosion in an acid typified by sulfuric acid and hydrofluoric acid takes the form of overall corrosion. Therefore, when stainless clad steel is used for marine structures typified by, for example, seawater desalination facilities and ship building (FPSO: Floating Production, Storage and Offloading system) or when stainless clad steel is used in an environment in which stainless clad steel is exposed to seawater, seawater pitting resistance which is sufficiently strong against a severe seawater corrosion environment is required. In addition, abrasion resistance which is sufficiently strong against impacts caused by floating objects such as ice and driftwood is also required.

As an example of a technique that increases seawater pitting resistance, Japanese Patent No. 4179133 discloses a method of manufacturing a stainless clad steel pipe, in which stainless steel with excellent seawater-resistance is used as a cladding material and carbon steel is used as a base material. It also discloses a technique of specifying conditions regarding a solution heat treatment and the chemical composition of carbon steel which is used as a base metal. However, in Japanese Patent No. 4179133, it is necessary that stainless steel used as a cladding material be selected in accordance with a use application (for example, marine structures) to achieve the corrosion resistance and seawater pitting resistance required in accordance with the use application of the stainless clad steel pipe. That is to say, only a technique in which the chemical composition of stainless steel is controlled is disclosed and, therefore, in the case of stainless clad steel, it is difficult to increase the reliability of the soundness of a bonding interface (bonding capability) and to maintain the qualities (corrosion resistance and mechanical properties) of the base material and the cladding material at the same time for all of the high-class steel materials and various grades of steel.

Japanese Patent No. 3336820 discloses a technique for providing a seawater corrosion resistant austenitic stainless cast steel and a seawater pump with excellent seawater pitting resistance. Specifically, regarding austenitic stainless cast steel having a chemical composition containing, by mass %, C: 0.08 wt % or less, Si: 0.5 to 1.5 wt %, Mn: 0.5 to 2 wt %, P: 0.04 wt % or less, S: 0.01 wt % or less, Ni: 8.0 to 9.5 wt %, and Cr: 18 to 21 wt %, the technique is realized by the stainless cast steel having a microstructure including 6 vol % or more of a δ ferrite phase or a cleanliness of 0.1% or less. However, Japanese Patent No. 3336820 specifies only certain ranges of the chemical composition of steel and the amount of a second phase precipitated, but does not sufficiently disclose a technique regarding the surface quality and abrasion resistance of a steel plate. In addition, since the material is cast steel, there is a disadvantage in terms of, for example, strength, and the material as it is cannot be used as a raw material for clad steel.

The corrosion resistance of stainless clad steel is determined by that of stainless steel used as a cladding material. To increase the corrosion resistance of stainless steel, alloy design is used in which a pitting index which is an index representing pitting resistance is increased by increasing the amounts of rare alloy elements such as Cr and Mo added.

In addition, in the case of clad steel, since it is necessary to achieve the strength and toughness for a base material and the corrosion resistance for a cladding material at the same time, it is necessary to select manufacturing conditions different from those for simple stainless steel even if the cladding material has the same chemical composition. Therefore, there is a problem in that it is not possible to completely prevent precipitation of a σ phase which causes a serious decrease in corrosion resistance due to sensitization. Therefore, it is necessary that the area ratio of a σ phase precipitated in steel be as small as possible within a realizable range in a practical manufacturing process.

However, in the case of conventional techniques, it is necessary to increase the amounts of expensive rare alloy elements such as Cr and Mo added to increase the pitting index, and it is necessary to perform advanced heat treatments such as rapid heating and rapid cooling to decrease the area ratio of a σ-phase and, therefore, there is an increase in load on the manufacturing process, which results in a decrease in manufacturability. These all cause an increase in the manufacturing cost of cladding material.

In addition, in the case of a clad steel plate, compatibility (such as bonding capability) between a cladding material and a base material is very important in a practical manufacturing process. Regarding this, in the case where the pitting index, that is, corrosion resistance is controlled by controlling additive chemical elements, it is unavoidable to increase the amount of alloy elements added and, as a result, there is only a limited choice of the kind of a cladding material that meets the desired corrosion resistance and there is a decrease in the degree of freedom in the choice of the base material. When the degree of freedom in the choice of the base material is small, it is difficult to decrease cost and there are situations where it is not possible to manufacture a clad steel plate depending on the desired corrosion resistance.

In view of the situation described above, it could be helpful to provide seawater-resistant stainless clad steel with excellent abrasion resistance and seawater pitting resistance.

SUMMARY

We thus provide:

[1] A seawater-resistant stainless clad steel including a cladding material made of stainless steel having a pitting index, which is represented by Cr[mass %]+3.3Mo[mass %]+16N[mass %], of 35.0 or more and a microstructure in a surface portion thereof including, by area ratio, less than 2.0% of a σ phase, in which dynamic friction coefficients in the rolling direction and in a direction at a right angle to the rolling direction determined in accordance with JIS K 7125 (1999) are both 0.05 or less.

[2] The seawater-resistant stainless clad steel according to item [1], in which a crystal grain size of the cladding material determined in accordance with JIS G 0551 is 6.0 or more.

[3] The seawater-resistant stainless clad steel according to item [1] or [2], in which the cladding material has a chemical composition including, by mass %, B: 0.0010% to 0.0050%.

[4] The seawater-resistant stainless clad steel according to any one of items [1] to [3], in which the stainless clad steel is manufactured by reheating a slab at a temperature of 900° C. to 1100° C., by hot-rolling the reheated slab, and by cooling the hot-rolled plate at a cooling rate of 0.2° C./s to 20° C./s without performing a normalizing treatment.

[5] The seawater-resistant stainless clad steel according to any one of items [1] to [3], in which the stainless clad steel is manufactured by reheating a slab at a temperature of 950° C. to 1150° C., by hot-rolling the reheated slab, by performing a normalizing treatment on the hot-rolled plate under the condition of a heating temperature of 800° C. to 1000° C., and by cooling the treated plate at a cooling rate of 1.0° C./s to 20° C./s.

Seawater-resistant stainless clad steel with excellent seawater pitting resistance and abrasion resistance can be obtained. Therefore, the seawater-resistant stainless clad steel can be suitably used for applications for which seawater pitting resistance is required, typified by marine structures, ship building including FPSO, and seawater desalination facilities.

DETAILED DESCRIPTION

We focused on the fact that water flows on the surfaces of ships and marine structures, in particular, on the surfaces of bodies of ships underway, that is, water flows on the surface of stainless clad steel, and investigated whether the corrosion resistance of stainless clad steel and the degree of freedom in manufacturing stainless clad steel could be increased. When water flows on the surface of stainless steel, it is possible to decrease the amount of extraneous matter such as sea salt particles and barnacles if the dynamic friction coefficient is small and, as a result, it is possible to suppress the corrosion of stainless steel caused by crevice corrosion occurring behind the extraneous matter, which results in an increase in corrosion resistance. We found that, by controlling the dynamic friction coefficient, it is possible to achieve high corrosion resistance with a pitting index and the area ratio of a σ phase being equivalent to those of conventional stainless steel.

In addition, since it is possible to achieve corrosion resistance equivalent to that of conventional stainless steel with a comparatively small pitting index and a comparatively large area ratio of a σ phase, the choice of a cladding material that meets desired corrosion resistance and the degree of freedom in the choice of the base material becomes large. Therefore, a decrease in cost and an increase in the degree of freedom in manufacturing stainless clad steel are realized.

Moreover, in the case of ships, since ships can run at a certain speed with less energy if friction resistance is low, there is an additional effect of saving fuel.

Although we focused on water flowing when a ship is traveling, even in marine structures and seawater desalination facilities which are stationary structures, it is possible to decrease the amount of extraneous matter such as sea salt particles and barnacles if the friction coefficient is small and, therefore, there is an advantage of suppressing crevice corrosion, which results not only in an increase in corrosion resistance, but also in an increase in the degree of freedom in manufacturing.

It is thus advantageous to manufacture seawater-resistant stainless clad steel with excellent abrasion resistance and seawater pitting resistance by controlling a dynamic friction coefficient to be equal to or less than a certain value and by controlling a pitting index and the area ratio of a σ phase.

Specifically, plural kinds of stainless clad steel having various chemical compositions which had been prepared by performing rolling and heat treatments under various conditions were subjected to various surface finishing treatments to investigate the influence of the chemical compositions of steel and surface quality on seawater pitting resistance and abrasion resistance. From the results of our investigations focusing on the chemical composition of steel, the dynamic friction coefficient, and seawater pitting resistance, we found that excellent abrasion resistance and seawater pitting resistance in a seawater environment can be achieved by manufacturing stainless clad steel including a cladding material made of stainless steel having a pitting index of 35.0 or more and a microstructure in the surface portion including, by area ratio, less than 2.0% of a σ phase, in which the dynamic friction coefficients (respectively μL and μC) of the surface of the stainless clad steel in the rolling (longitudinal) direction and in a direction (C) at a right angle to the rolling direction determined in accordance with JIS K 7125 (1999) are both 0.05 or less.

Hereafter, our stainless clad steel will be described.

First, stainless steel (cladding material) of the stainless clad steel will be described.

The stainless steel to be used as a cladding material is characterized in that the cladding material has a pitting index, which is represented by Cr[mass %]+3.3Mo[mass %]+16N[mass %] as described in (Incorporated Foundation) Coastal Development Institute of Technology; "Harbor Steel Structure, Corrosion Protection and Repair Manual," 2009 Edition, page 132, of 35.0 or more. To use stainless steel for marine structures and ship building without painting, it is necessary that the stainless steel have sufficient seawater pitting resistance in a seawater environment. Stainless steel having a pitting index of less than 35.0 does not have sufficient corrosion resistance in seawater, in particular in a crevice formed by a barnacle adhering to the stainless steel. Therefore, pitting occurs and grows in seawater, which results in a decrease in seawater pitting resistance. Accordingly, if the dynamic friction coefficient on a surface described later is controlled, sufficient seawater pitting resistance is not obtained. The pitting index is thus 35.0 or more, preferably 36.0 or more. In addition, the upper limit of a pitting index is 52.0 or less.

The area ratio of a σ phase in the surface portion of stainless steel is less than 2.0%. A σ phase is an intermetallic compound mainly containing Fe, Cr, and Mo. In stainless steel containing large amounts of Cr and Mo, it is known that a σ phase is precipitated in a temperature range from 600° C. to 900° C. and is most likely to be precipitated at a temperature around 750° C. In a practical process, a σ phase is precipitated when stainless steel has a temperature in the range described above during slab heating, hot rolling, cold rolling, and normalizing processes. Since the contents of Mo and Cr, which contribute to an increase in the corrosion resistance of stainless steel, are larger in a σ phase than in a parent phase, there is an increase in sensitivity for sensitization, in which a Mo and Cr depletion phase is formed, around a σ phase, and a relative decrease in the contents of Mo and Cr in a parent phase. Therefore, a σ phase causes a decrease in seawater pitting resistance. Although it is preferable that the amount of a σ phase precipitated be as small as possible (more preferably zero), it is possible that a σ phase is inevitably precipitated. In that case, in particular, particles of a σ phase precipitated along grain boundaries may be continuously connected to each other and cause the loss of crystal grains, which may cause a serious decrease in corrosion resistance.

Therefore, when the area ratio of a σ phase is less than 2.0%, sufficient seawater pitting resistance can be achieved. It is preferable that the area ratio of a σ phase be 1.0% or less. The area ratio of a σ phase is derived by machining the surface of a steel material to a depth of 0.3 mm, embedding the machined sample in a resin, performing mirror polishing on the surface of the embedded sample, etching the polished surface using royal water, observing and taking photographs of five microscopic fields of 50 μm×50 μm using a SEM at a magnification of 1000 times, and performing image analysis of the photographs.

As the base material, carbon steel or low-alloy steel may be used.

The dynamic friction coefficients (respectively μL and μC) of the surface of the stainless clad steel in the rolling direction and in a direction (C) at a right angle to the rolling direction determined in accordance with JIS K 7125 are both 0.05 or less. The surface quality, that is, the friction resistance of the stainless clad steel has a great influence on abrasion resistance and seawater pitting resistance. For example, regarding an ice breaking ship, when the friction resistance between the body of the ice breaking ship and ice is large, the whole resistance against the traveling ship is large, which decreases traveling performance.

In addition, when the friction resistance is large, extraneous matter such as sea salt particles and barnacles easily adheres to the surface of stainless clad steel which is immersed in seawater, and causes crevices to be easily formed. Moreover, since the surface area of stainless clad steel is increased, soluble precipitates present at the grain boundaries and inside the grains emerge in large numbers, which results in an increase in the number of brittle portions which may become the sources of pitting. From the results of investigations in consideration of an increase in seawater pitting resistance and a decrease in friction resistance, and the removal of extraneous matter, we found that, by controlling the dynamic friction coefficients (respectively μL and μC) of the surface of the stainless clad steel in the rolling direction and in a direction (C) at a right angle to the rolling direction determined in accordance with JIS K 7125 to be both 0.05 or less, preferably 0.04 or less, there is a decrease in the friction resistance of the surface of stainless clad steel immersed in seawater, which results in a significant increase in abrasion resistance and seawater pitting resistance.

In addition, when there is anisotropy in the friction resistance, we believe that there is a difference in surface quality depending on orientations. Moreover, since the dynamic friction coefficient in a certain orientation is large, there is a problem in practical use in that it is necessary to give consideration to the direction of a stainless clad steel plate when using it. Therefore, focusing on the dynamic friction coefficient and its anisotropy, it is preferable that the ratio of the dynamic friction coefficients (L/C) in the rolling direction (L) and in a direction (C) at a right angle to the rolling direction is 0.50 or more and 2.0 or less, more preferably 0.60 or more and 1.7 or less.

Moreover, regarding the microstructure of a cladding material, if the same number of precipitates are considered, when the crystal grain size is small, since there is an increase in the length of grain boundaries in a certain volume, precipitates are dispersed at grain boundaries without being continuously connected to each other, which results in a decrease in the degree of sensitization. Therefore, it is effective to control a grain size number on a plate surface determined in accordance with JIS G 0551 to be 6.0 or more.

Although it is preferable that the chemical composition of a cladding material be the one described below, it is effective to add 0.0010% to 0.0050% of B to suppress precipitation of a σ phase on grain boundaries and decrease sensitization.

Regarding the chemical composition of the cladding material, it is preferable to use steel having a chemical composition containing C: 0.03% or less, Si: 1.50% or less, Mn: 2.0% or less, P: 0.04% or less, S: 0.03% or less, Cu: 2.0% or less, Ni: 17.0% to 25.0%, Cr: 19.0% to 26.0%, Mo: 3.0% to 6.0%, and N: 0.10% to 0.35%. When B is added, a B content of 0.0010% or more realizes an effect of suppressing precipitation of a σ phase on grain boundaries, and a B content of more than 0.0050% causes hardening and has a negative effect on bonding capability. Therefore, it is preferable that the B content be 0.0010% to 0.0050%, more preferably 0.0020% to 0.0040%.

Subsequently, a method of manufacturing the stainless clad steel will be described.

The stainless clad steel is manufactured by bonding (cladding) stainless steel as a cladding material to one or both sides of a base material.

Regarding a method of manufacturing a cladding material and a base material, the materials may be smelted using a known method such as one using a converter furnace, an electric furnace, or a vacuum furnace, and steel materials (slabs) may be manufactured using a continuous casting method or an ingot making-slabbing method. Subsequently, by treating the obtained slabs through processes of hot rolling, annealing on a hot-rolled plate (using, for example, a box annealing method), and pickling in this order under common conditions, hot-rolled plates are manufactured.

There is no particular limitation on what method is used to bond the cladding material and the base material, and examples of a method of bonding include a rolling method, an explosive bonding method, and an overlay (build-up) method.

After the cladding material and the base material have been bonded, the bonded material is hot-rolled, and normalizing (normalizing heating treatment) is performed on the hot-rolled plate, if necessary. The normalizing treatment may be omitted. Usually, when normalizing, a σ phase, which is thought to cause a decrease in seawater pitting resistance, tends to be precipitated. Precipitation of a σ phase can be prevented by omitting normalizing. However, when normalizing is omitted, it is not possible to achieve sufficient strength and toughness for a base material. Therefore, when normalizing is omitted, it is preferable that a slab reheating temperature is 900° C. to 1100° C. and that the bonded cladding material and base material obtained after hot rolling has been performed is cooled at a cooling rate of 0.2° C./s or more and 20° C./s or less. Since it is possible to achieve sufficient strength and toughness by performing hot rolling under the conditions described above, it is possible to manufacture stainless clad steel with excellent abrasion resistance and seawater pitting resistance. Regarding conditions other than those described above, it is preferable that a total reduction ratio is 3 or more, the controlled rolling (CR) ratio is 30% or more, the cooling start temperature is about 850° C. and the cooling stop temperature is about 600° C.

When normalizing is not omitted, it is preferable that a slab reheating temperature is 950° C. to 1150° C. and the heating temperature for normalizing is 800° C. to 1000° C. Moreover, it is preferable that the bonded cladding material and base material obtained after normalizing has been performed are cooled at a cooling rate of 1.0° C./s to 20° C./s. When normalizing is performed, it is possible to suppress precipitation of a σ phase resulting from normalization by controlling hot rolling and the cooling rate as described above. As a result, it is possible to manufacture stainless clad steel with excellent abrasion resistance and seawater pitting resistance.

Subsequently, the surface of the cladding material is treated to control the dynamic friction coefficient of the surface of the stainless clad steel obtained to 0.05 or less.

Specifically, in addition to mechanical treatment such as grindstone polishing and belt polishing, it is preferable to perform chemical treatment in combination such as one using Ruthner method (an electrolytic treatment using a 20% sodium sulfate solution or a sodium nitrate solution) or an electrolytic treatment using a 10 to 30% nitric acid solution to remove inclusions and strengthen a passivation film on the surface.

It is also possible to achieve a dynamic friction coefficient of 0.05 or less with the following method. That is to say, it is possible to control surface properties to be within specified ranges by controlling surface quality using, in combination, chemical treatment as needed in addition to mechanical treatment as described below. Examples of mechanical treatment include common belt polishing and grindstone polishing, and these conventional surface polishing methods may be used in combination. By using these methods in combination, it is possible to control the surface roughness to be low. In addition, to remove inclusions and strengthen a passivation film on the surface, it is preferable that chemical treatment be performed. Although there is no particular limitation on what kind of chemical treatment is performed, it is preferable to perform pickling in nitric acid, hydrofluoric nitric acid, sulfuric acid or hydrochloric acid, or an electrolytic treatment in these acid solutions or in neutral salt solutions (for example, Ruthner method: in a 20% sodium sulfate solution or a sodium nitrate solution).

For example, the specified properties can be also achieved by polishing the surface of stainless steel in the longitudinal direction using a multi-pass belt polishing method, for example, to #80 finish (in a range from #60 to #240), to #240 finish (in a range from #120 to #400), by subsequently polishing the surface of the stainless steel in a direction at a right angle to the longitudinal direction using a multi-pass belt polishing method, for example, to #240 finish (in a range from #120 to #400), to #600 finish (in a range from #400 to #800), by spraying a 30% (in a range from 20% to 35%) nitric acid solution (room temperature) onto the surface of the polished stainless steel at a spray velocity of 1 L/min (in a range from 200 ml/min to 10 L/min) for 20 seconds (in a range from 5 seconds to 10 minutes), by rinsing the sprayed stainless steel in water, and by subsequently performing a passivation treatment.

By being subjected to the processes described above, the seawater-resistant stainless clad steel can be obtained. Note that, the seawater-resistant stainless clad steel includes both hot-rolled steel plates and steel plates subjected to a normalizing heat treatment after hot rolling has been performed, and similar effects are realized with these steel plates.

Example 1

Our steels and methods will be described in detail.

Austenitic stainless steels 1 through 12 to be used as cladding materials having the chemical compositions given in Table 1 were smelted and made into steel slabs. Also, common steels A and B to be used as base materials having the chemical compositions given in Table 1 were smelted and made into steel slabs. Subsequently, by treating the obtained slabs through processes of hot rolling, annealing on a hot-rolled plate, and pickling in this order, hot-rolled plates were prepared and used as the cladding materials and base materials of stainless clad steel.

Subsequently, a cladding material (having a thickness of 15 mm) and a base material (having a thickness of 55 mm) were assembled to form a slab-shape material having a width of 1890 mm and a length of 2060 mm, and the assembled material was subjected to hot rolling under the conditions given in Table 2, to prepare stainless clad steel (cladding material: 3 mm in thickness, base material: 11 mm in thickness, having a width of 2500 mm and a length of 8000 mm). In addition, some of the prepared stainless clad steels were subjected to normalizing under the conditions given in Table 3.

The stainless clad steel obtained as described above was subjected to belt polishing so that the surface had the roughness conditions given in Table 4. Specifically, belt polishing was performed to #80, #240, and #400 finishes. Moreover, a known conventional pickling treatment was performed to decrease the surface roughness.

same position were measured in accordance with JIS K 7125. This measurement was performed at five places, and the average values of the measured values respectively in the

TABLE 1

| Steel Grade No. | Chemical Composition (mass %) | | | | | | | | | | | Pitting Index (PI) * |
|---|---|---|---|---|---|---|---|---|---|---|---|---|
| | C | Si | Mn | P | S | Cr | Ni | Mo | Cu | N | B | |
| Cladding Material 1 | 0.020 | 0.41 | 1.01 | 0.041 | 0.004 | 18.3 | 8.3 | 0.2 | 0.02 | 0.05 | Tr. | 19.8 |
| Cladding Material 2 | 0.020 | 0.60 | 0.80 | 0.038 | 0.005 | 17.4 | 12.5 | 2.2 | 0.28 | 0.04 | Tr. | 25.2 |
| Cladding Material 3 | 0.020 | 0.61 | 0.80 | 0.042 | 0.005 | 18.1 | 12 | 3.5 | 0.001 | 0.03 | Tr. | 30.1 |
| Cladding Material 4 | 0.015 | 0.55 | 0.08 | 0.041 | 0.005 | 22.1 | 5.0 | 3.0 | 0.001 | 0.15 | Tr. | 34.4 |
| Cladding Material 5 | 0.014 | 0.60 | 0.80 | 0.033 | 0.005 | 25.1 | 6.1 | 3.3 | 0.001 | 0.15 | Tr. | 38.4 |
| Cladding Material 6 | 0.016 | 0.26 | 0.53 | 0.026 | 0.007 | 24.4 | 23.2 | 4.2 | 1.52 | 0.15 | Tr. | 40.6 |
| Cladding Material 7 | 0.016 | 0.26 | 0.53 | 0.026 | 0.007 | 24.4 | 23.2 | 4.2 | 0.001 | 0.15 | Tr. | 40.6 |
| Cladding Material 8 | 0.017 | 0.24 | 0.51 | 0.024 | 0.009 | 23.0 | 23.1 | 3.2 | 0.001 | 0.15 | Tr. | 36.0 |
| Cladding Material 9 | 0.007 | 0.25 | 0.63 | 0.024 | 0.005 | 19.8 | 24.9 | 6.2 | 0.200 | 0.225 | Tr. | 43.9 |
| Cladding Material 10 | 0.016 | 0.26 | 0.53 | 0.026 | 0.007 | 24.4 | 23.2 | 4.2 | 0.001 | 0.15 | 0.0014 | 40.6 |
| Cladding Material 11 | 0.016 | 0.26 | 0.53 | 0.026 | 0.007 | 24.4 | 23.2 | 4.2 | 0.001 | 0.15 | 0.0025 | 40.6 |
| Cladding Material 12 | 0.016 | 0.26 | 0.53 | 0.026 | 0.007 | 24.4 | 23.2 | 4.2 | 0.001 | 0.15 | 0.0045 | 40.6 |
| Base Material A | 0.140 | 0.200 | 0.650 | 0.019 | 0.003 | 0.040 | 0.020 | 0.001 | 0.001 | 0.004 | Tr. | — |
| Base Material B | 0.120 | 0.350 | 1.550 | 0.013 | 0.003 | 0.020 | 0.370 | 0.001 | 0.330 | 0.100 | Tr. | — |

* Pitting Index (PI): Cr + 3.3Mo + 16N

TABLE 2

| Condition | Slab Reheating Temperature (° C.) | Finishing Rolling Temperature (° C.) | Water Cooling Start Temperature (° C.) | Water Cooling Stop Temperature (° C.) | Cooling Rate after Hot Rolling (° C./s) |
|---|---|---|---|---|---|
| A | 1060 | 920 | without Water Cooling | without Water Cooling | 0.2 |
| B | 1060 | 920 | 850 | 600 | 1.0 |
| C | 1060 | 920 | 850 | 600 | 7.1 |

TABLE 3

| Condition | Normalizing Condition (Heating Temperature, Holding Time) | Cooling Rate after Normalizing (° C./s) |
|---|---|---|
| 1 | without Normalizing | |
| 2 | 950° C., 10 Minute-Holding | 0.2 |
| 3 | 950° C., 10 Minute-Holding | 1.0 |
| 4 | 950° C., 10 Minute-Holding | 7.0 |

Using the stainless clad steel obtained as described above, a dynamic friction coefficient and the area ratio of a σ phase were determined. In addition, a pitting potential, a CPT (Critical Pitting Temperature), and a CCT (Critical Crevice Temperature) were determined to evaluate seawater pitting resistance. In addition, a strength test and a Charpy impact test were performed, and toughness was evaluated using the derived Charpy impact value. The methods for determining a pitting potential, a dynamic friction coefficient, the area ratio of a σ phase, a CPT, a CCT, strength, and a Charpy impact value will be described below.

(1) Pitting Potential

A pitting potential was determined under the conditions in accordance with JIS G 0577 except that a test temperature was 70° C. A potential with which a current density reaches 100 μA/cm2 is represented as a pitting potential. A pitting potential of 400 mV or more was evaluated as satisfactory.

(2) Dynamic Friction Coefficient

Dynamic coefficients in the rolling direction (L) and in a direction (C) at a right angle to the rolling direction at the same position were measured in accordance with JIS K 7125. This measurement was performed at five places, and the average values of the measured values respectively in the rolling direction (L) and in the direction (C) at a right angle to the rolling direction were defined as dynamic coefficients in the rolling direction (L) and in the direction (C) at a right angle to the rolling direction. In addition, L/C was derived by calculating the ratio between the dynamic friction coefficients in the rolling direction (L) and in the direction (C) at a right angle to the rolling direction.

(3) CPT (Critical Pitting Temperature)

An immersion test was performed in a 6% FeCl3+1% HCl solution at intervals of 5° C. in accordance with ASTM G 48 (method E). The test piece had a width of 20 mm, a length of 50 mm, and a thickness of 2.0 mm. For each test condition, the immersion test was performed three times, and a case where the maximum pitting depth reached 0.025 mm was evaluated as unsatisfactory. A case where a pitting depth was less than 0.025 mm for all of the three immersion tests was evaluated as satisfactory, and the highest temperature at which the result was evaluated as satisfactory was defined as a CPT (° C.). A satisfactory value for a CPT was 40° C. or higher, preferably 50° C. or higher.

(4) CCT (Critical Crevice Temperature)

An immersion test was performed in a similar way as done for a CPT in accordance with ASTM G 48. For each test condition, the immersion test was performed three times, and when the maximum pitting depth reached 0.025 mm was evaluated as unsatisfactory. When the pitting depth was less than 0.025 mm for all of the three immersion tests was evaluated as satisfactory, and the highest temperature at which the result was evaluated as satisfactory was defined as a CCT (° C.). A satisfactory value for a CCT was 20° C., preferably 30° C. or higher.

(5) Area Ratio of σ Phase

By observing five microscopic fields of 50 μm×50 μm using a SEM at a magnification of 1000 times and by performing image analysis on each of the photographs taken for the five microscopic fields, the area ratio of a σ phase for each microscopic field is derived. The average value thereof was calculated as the area ratio of a σ phase.

(6) Strength

A tensile test was performed in accordance with JIS G 3601, and a tensile strength of 490 MPa or more was evaluated as satisfactory.

(7) Charpy Impact Value

A Charpy impact test was performed in accordance with JIS G 3106 to determine a Charpy impact value. An absorbed energy in a Charpy impact test of 50 J or more at a temperature of −40° C. was evaluated as satisfactory.

The evaluated results are given in Table 4. It is clarified that it is possible to obtain stainless clad steel with excellent seawater pitting resistance and abrasion resistance in the case of our examples.

TABLE 4

| No. | Steel Grade No. Cladding Material | Steel Grade No. Base Material | Hot Rolling Condition | Normalizing and Cooling Condition | Pitting Index (PI) | Dynamic Friction Coefficient Rolling Direction (L) | Dynamic Friction Coefficient Cross Direction (C) | (L)/(C) |
|---|---|---|---|---|---|---|---|---|
| 1 | 1 | A | A | 1 | 19.8 | 0.03 | 0.05 | 0.60 |
| 2 | 1 | A | C | 1 | 19.8 | 0.03 | 0.05 | 0.60 |
| 3 | 2 | A | A | 1 | 25.2 | 0.03 | 0.05 | 0.60 |
| 4 | 2 | A | C | 1 | 25.2 | 0.03 | 0.05 | 0.60 |
| 5 | 3 | A | A | 1 | 30.1 | 0.03 | 0.05 | 0.60 |
| 6 | 3 | A | B | 1 | 30.1 | 0.03 | 0.05 | 0.60 |
| 7 | 3 | A | C | 1 | 30.1 | 0.03 | 0.05 | 0.60 |
| 8 | 3 | A | A | 2 | 30.1 | 0.03 | 0.05 | 0.60 |
| 9 | 4 | A | A | 1 | 34.4 | 0.03 | 0.05 | 0.60 |
| 10 | 4 | A | A | 2 | 34.4 | 0.03 | 0.05 | 0.60 |
| 11 | 4 | A | A | 3 | 34.4 | 0.03 | 0.05 | 0.60 |
| 12 | 5 | A | A | 1 | 38.4 | 0.03 | 0.05 | 0.60 |
| 13 | 5 | A | A | 2 | 38.4 | 0.03 | 0.05 | 0.60 |
| 14 | 5 | A | A | 3 | 38.4 | 0.03 | 0.05 | 0.60 |
| 15 | 6 | A | A | 1 | 40.6 | 0.03 | 0.05 | 0.60 |
| 16 | 6 | A | A | 2 | 40.6 | 0.03 | 0.05 | 0.60 |
| 17 | 6 | A | B | 2 | 40.6 | 0.03 | 0.05 | 0.60 |
| 18 | 6 | A | C | 2 | 40.6 | 0.03 | 0.05 | 0.60 |
| 19 | 6 | A | A | 3 | 40.6 | 0.03 | 0.05 | 0.60 |
| 20 | 6 | A | A | 4 | 40.6 | 0.03 | 0.05 | 0.60 |
| 21 | 6 | A | A | 1 | 40.6 | 0.06 | 0.06 | 1.00 |
| 22 | 6 | A | A | 1 | 40.6 | 0.08 | 1.02 | 0.08 |
| 23 | 7 | A | A | 1 | 40.6 | 0.03 | 0.05 | 0.60 |
| 24 | 7 | A | A | 3 | 40.6 | 0.03 | 0.05 | 0.60 |
| 25 | 8 | B | A | 1 | 36.0 | 0.03 | 0.05 | 0.60 |
| 26 | 8 | B | B | 1 | 36.0 | 0.03 | 0.05 | 0.60 |
| 27 | 8 | B | C | 1 | 36.0 | 0.02 | 0.02 | 1.00 |
| 28 | 8 | B | A | 2 | 36.0 | 0.03 | 0.05 | 0.60 |
| 29 | 8 | B | A | 3 | 36.0 | 0.04 | 0.06 | 0.67 |
| 30 | 8 | B | A | 3 | 36.0 | 0.08 | 0.10 | 0.80 |
| 31 | 8 | B | A | 3 | 36.0 | 0.03 | 0.05 | 0.60 |
| 32 | 8 | B | A | 4 | 36.0 | 0.08 | 0.10 | 0.80 |
| 33 | 9 | B | A | 3 | 43.9 | 0.04 | 0.06 | 0.67 |
| 34 | 6 | A | A | 4 | 40.6 | 0.03 | 0.05 | 0.60 |
| 35 | 6 | A | A | 4 | 40.6 | 0.03 | 0.05 | 0.60 |
| 36 | 6 | A | A | 4 | 40.6 | 0.03 | 0.05 | 0.60 |
| 37 | 10 | A | A | 1 | 40.6 | 0.03 | 0.05 | 0.60 |
| 38 | 11 | A | A | 1 | 40.6 | 0.03 | 0.05 | 0.60 |
| 39 | 12 | A | A | 1 | 40.6 | 0.03 | 0.05 | 0.60 |

| No. | σ Phase Area Ratio (%) | Pitting Potential | CPT (° C.) | CCT (° C.) | Strength/ TS (MPa) | Absorbed Energy at −40° C. (J) | Note |
|---|---|---|---|---|---|---|---|
| 1 | 0 | 23 | <0 | <0 | 531 | 331 | Comparative Example |
| 2 | 0 | 20 | <0 | <0 | 540 | 350 | Comparative Example |
| 3 | 0 | 91 | 10 | <0 | 550 | 323 | Comparative Example |
| 4 | 0 | 96 | 10 | <0 | 563 | 345 | Comparative Example |
| 5 | 0.5 | 218 | 30 | 10 | 553 | 320 | Comparative Example |
| 6 | 0 | 223 | 30 | 10 | 563 | 335 | Comparative Example |
| 7 | 0 | 225 | 30 | 10 | 570 | 341 | Comparative Example |
| 8 | 2.1 | 208 | 25 | 5 | 523 | 280 | Comparative Example |
| 9 | 0 | 305 | 40 | 20 | 540 | 300 | Comparative Example |
| 10 | 2.5 | 181 | 25 | 5 | 514 | 251 | Comparative Example |
| 11 | 1.5 | 222 | 30 | 10 | 530 | 218 | Comparative Example |
| 12 | 0.9 | 413 | 50 | 30 | 563 | 190 | Example |
| 13 | 7 | 209 | 30 | 10 | 555 | 35 | Comparative Example |
| 14 | 1.3 | 420 | 40 | 20 | 553 | 103 | Example |

TABLE 4-continued

| | | | | | | | |
|---|---|---|---|---|---|---|---|
| 15 | 0.6 | 743 | 60 | 40 | 570 | 180 | Example |
| 16 | 3.5 | 320 | 40 | 20 | 533 | 40 | Comparative Example |
| 17 | 3.0 | 380 | 40 | 20 | 554 | 48 | Comparative Example |
| 18 | 2.5 | 390 | 45 | 20 | 543 | 57 | Comparative Example |
| 19 | 1.6 | 470 | 50 | 30 | 563 | 135 | Example |
| 20 | 1.0 | 580 | 50 | 30 | 579 | 152 | Example |
| 21 | 0.6 | 380 | 45 | 25 | 568 | 173 | Comparative Example |
| 22 | 0.6 | 160 | 20 | <0 | 559 | 179 | Comparative Example |
| 23 | 0.8 | 850 | 65 | 45 | 562 | 181 | Example |
| 24 | 1.5 | 420 | 45 | 25 | 555 | 63 | Example |
| 25 | 0 | 720 | 60 | 40 | 543 | 173 | Example |
| 26 | 0 | 769 | 65 | 45 | 550 | 220 | Example |
| 27 | 0 | >1000 | 70 | 55 | 558 | 215 | Example |
| 28 | 3.3 | 155 | 20 | 10 | 540 | 70 | Comparative Example |
| 29 | 1.3 | 398 | 35 | 25 | 545 | 65 | Comparative Example |
| 30 | 1.3 | 199 | 30 | 15 | 543 | 68 | Comparative Example |
| 31 | 1.3 | 600 | 50 | 30 | 546 | 213 | Example |
| 32 | 0.9 | 220 | 30 | 5 | 557 | 231 | Comparative Example |
| 33 | 1.6 | 629 | 45 | 25 | 589 | 70 | Example |
| 34 | 0.9 | 600 | 55 | 35 | 582 | 149 | Example |
| 35 | 0.8 | 621 | 55 | 35 | 586 | 141 | Example |
| 36 | 0.8 | 615 | 50 | 30 | 599 | 130 | Example |
| 37 | 0.8 | 855 | 65 | 45 | 564 | 185 | Example |
| 38 | 0.8 | 852 | 65 | 45 | 566 | 193 | Example |
| 39 | 0.8 | 848 | 65 | 45 | 568 | 198 | Example |

The influence of a crystal grain size on pitting resistance is given in Table 5. Using clad steel including cladding material No. 6 and base material A given in Table 1, a slab reheating temperature and hot rolling conditions were varied to prepare plural kinds of clad steel which were different from each other only in crystal size and which had almost the same amount of a σ phase precipitated in steel. In the case where a grain size number is 6.0 or more, there is a further increase in corrosion resistance.

TABLE 5

| | Steel Grade No. | | Slab Reheating | Finishing Rolling | Water Cooling Start | Water Cooling Stop | Cooling Rate after Hot | Normalizing Condition | Pitting |
|---|---|---|---|---|---|---|---|---|---|
| No. | Cladding Material | Base Material | Temperature (° C.) | Temperature (° C.) | Temperature (° C.) | Temperature (° C.) | Rolling (° C./s) | (Corresponding to Table 3) | Index (PI) |
| 1 | 6 | A | 1140 | 1000 | 900 | 600 | 1.0 | 1 | 40.6 |
| 2 | 6 | A | 1100 | 960 | 900 | 600 | 1.0 | 1 | 40.6 |
| 3 | 6 | A | 1080 | 940 | 900 | 600 | 1.0 | 1 | 40.6 |
| 4 | 6 | A | 1060 | 920 | 850 | 600 | 1.0 | 1 | 40.6 |
| 5 | 6 | A | 1020 | 900 | 850 | 600 | 1.0 | 1 | 40.6 |

| | Dynamic Friction Coefficient | | | σ Phase Area Ratio (%) | Pitting Potential | CPT (° C.) | Cladding Material Grain Size Number (Gs. No.) |
|---|---|---|---|---|---|---|---|
| No. | Rolling Direction (L) | Cross Direction (C) | (L)/(C) | | | | |
| 1 | 0.03 | 0.05 | 0.60 | 0.6 | 580 | 40 | 4.0 |
| 2 | 0.03 | 0.05 | 0.60 | 0.6 | 620 | 45 | 5.5 |
| 3 | 0.03 | 0.05 | 0.60 | 0.7 | 720 | 55 | 6.0 |
| 4 | 0.03 | 0.05 | 0.60 | 0.6 | 753 | 60 | 6.5 |
| 5 | 0.03 | 0.05 | 0.60 | 0.7 | 760 | 60 | 7.0 |

The invention claimed is:

1. A manufacturing method for a seawater-resistant stainless clad steel comprising a cladding material made of stainless steel having a pitting index represented by Cr[mass %]+3.3Mo[mass %]+16N[mass %], of 35.0 or more and a microstructure in a surface portion thereof including, by area ratio, less than 2.0% of a σ phase, the method comprising the steps of: performing a mechanical treatment from at least one of grindstone polishing and belt polishing; and performing at least one of an electrolytic treatment in acid solutions or in neutral salt solutions, and a pickling treatment, to manufacture the stainless clad steel having dynamic friction coefficients in a rolling direction and in a direction at a right angle to the rolling direction, determined in accordance with JIS K 7125, both of 0.05 or less, wherein a crystal grain size of the cladding material determined in accordance with JIS G 0551 is 6.0 or more.

2. The method according to claim 1, wherein the cladding material has a chemical composition including, by mass %, B:0.0010% to 0.0050%.

3. The method according to claim 2, wherein the clad steel has at least one of:

(iv) a pitting potential of 400 mV or more, (v) a critical pitting temperature of 40° C. or higher, and (vi) a critical crevice temperature of 20° C. or higher.

4. The method according to claim 1, further comprising the steps of:
- bonding the cladding material and a base material to form a bonded material as a slab;
- reheating the slab at a temperature of 900° C. to 1100° C.;
- hot-rolling the reheated slab to form a hot-rolled plate;
- cooling the hot-rolled plate at a cooling rate of 0.2° C./s to 20° C./s without performing a normalizing treatment; and
- subsequently performing the mechanical treatment and performing at least one of the electrolytic treatment and the pickling treatment.

5. The method according to claim 1, further comprising the steps of:
- bonding the cladding material and a base material to form a bonded material as a slab;
- reheating the slab at a temperature of 950° C. to 1150° C.;
- hot-rolling the reheated slab to form a hot-rolled plate;
- performing a normalizing treatment on the hot-rolled plate under the conditions of a heating temperature of 800° C. to 1000° C.;
- cooling the treated plate at a cooling rate of 1.0° C./s to 20° C./s; and
- subsequently performing the mechanical treatment and performing at least one of the electrolytic treatment and the pickling treatment.

6. The method according to claim 1, wherein the stainless clad steel has a ratio of the dynamic friction coefficients (L/C) in the rolling direction (L) and in a direction (C) at a right angle to the rolling direction of 0.50 or more and 2.0 or less.

7. The method according to claim 1, wherein the cladding material has a chemical composition including, by mass %, C: 0.03% or less, Si: 1.50% or less, Mn: 2.0% or less, P: 0.04% or less, S: 0.03% or less, Cu: 2.0% or less, Ni: 17.0% to 25.0%, Cr: 19.0% to 26.0%, Mo: 3.0% to 6.0%, and N: 0.10% to 0.35%.

8. The method according to claim 7, wherein the clad steel has at least one of:
- (i) a pitting potential of 400 mV or more,
- (ii) a critical pitting temperature of 40° C. or higher, and
- (iii) a critical crevice temperature of 20° C. or higher.

9. The method according to claim 1, wherein the clad steel has at least one of:
- (i) a pitting potential of 400 mV or more,
- (ii) a critical pitting temperature of 40° C. or higher, and
- (iii) a critical crevice temperature of 20° C. or higher.

* * * * *